United States Patent
Wilson et al.

(10) Patent No.: US 11,507,861 B2
(45) Date of Patent: Nov. 22, 2022

(54) MACHINE LEARNING TECHNIQUES FOR IMPROVED WATER CONSERVATION AND MANAGEMENT

(71) Applicant: SweetSense, Inc., Denver, CO (US)

(72) Inventors: Daniel Wilson, Denver, CO (US); Jeremy Coyle, Denver, CO (US); Evan Thomas, Denver, CO (US); Skot Croshere, Denver, CO (US)

(73) Assignee: SWEETSENSE, INC., Denver, CO (US)

( * ) Notice: Subject to any disclaimer, the term of this patent is extended or adjusted under 35 U.S.C. 154(b) by 408 days.

(21) Appl. No.: 16/801,722

(22) Filed: Feb. 26, 2020

(65) Prior Publication Data
US 2020/0356876 A1 Nov. 12, 2020

Related U.S. Application Data

(60) Provisional application No. 62/843,836, filed on May 6, 2019.

(51) Int. Cl.
*G06N 5/04* (2006.01)
*G06N 20/00* (2019.01)
*G06Q 50/06* (2012.01)
*H04Q 9/00* (2006.01)
*G06Q 10/00* (2012.01)
*H04L 67/12* (2022.01)

(52) U.S. Cl.
CPC ............... *G06N 5/04* (2013.01); *G06N 20/00* (2019.01); *G06Q 10/20* (2013.01); *G06Q 50/06* (2013.01); *H04Q 9/00* (2013.01); *H04L 67/12* (2013.01); *H04Q 2209/10* (2013.01); *H04Q 2209/70* (2013.01)

(58) Field of Classification Search
CPC .......... G06N 5/04; G06N 20/00; G06N 5/003; G06N 20/20; G06Q 10/20; G06Q 50/06; H04Q 9/00; H04Q 2209/10; H04Q 2209/70
USPC .......................................................... 706/12
See application file for complete search history.

(56) References Cited

U.S. PATENT DOCUMENTS

| | | | |
|---|---|---|---|
| 2017/0323216 A1* | 11/2017 | Fano ...................... | G06N 20/00 |
| 2018/0106261 A1* | 4/2018 | Zhang ..................... | G01M 3/00 |
| 2018/0299375 A1* | 10/2018 | Young ................ | G01N 15/0656 |
| 2019/0018067 A1* | 1/2019 | Kong .................... | G01R 31/367 |
| 2019/0353156 A1* | 11/2019 | Ward ...................... | F04D 13/08 |
| 2019/0362162 A1* | 11/2019 | Averbuch ............... | G01C 21/30 |
| 2020/0115880 A1* | 4/2020 | Bertini .................... | E02D 29/12 |

* cited by examiner

*Primary Examiner* — Kwang B Yao
*Assistant Examiner* — Syed M Bokhari
(74) *Attorney, Agent, or Firm* — K&L Gates LLP

(57) ABSTRACT

Methods and systems for collecting and analyzing sensor data to predict water fixture failure and water consumption are provided. In one embodiment, a method is provided that includes receiving sensor data regarding a water fixture. Changepoints may then be calculated within the sensor data and the sensor data may be split into intervals at the changepoints. A machine learning model may then be used to classify the intervals and a status of the water fixture and water consumption may be identified based on the classified intervals.

18 Claims, 7 Drawing Sheets

MACHINE LEARNING TECHNIQUES FOR IMPROVED WATER CONSERVATION AND MANAGEMENT

CROSS-REFERENCE TO RELATED APPLICATIONS

The present application claims priority to U.S. Provisional Patent Application No. 62/843,836, entitled "MACHINE LEARNING TECHNIQUES FOR IMPROVED WATER SERVICE DELIVERY" and filed on May 6, 2019, the disclosure of which is incorporated herein by reference for all purposes.

GOVERNMENT PATENT RIGHTS STATEMENT

This invention was made with Government support under Contract No. 1738321, awarded by the National Science Foundation. The Government has certain rights in this invention.

BACKGROUND

Many areas that lack a consistent water supply and/or require improved water conservation measures are also remote and hard to access. In many cases, fixtures such as pumps, plumbing, and bacterial sensors can be put in place to ensure that these areas receive consistent, safe water and water is conserved. However, these fixtures can break down or consume water unsustainably, requiring monitoring maintenance to restore the fixtures to working order and to conserve water supplies.

SUMMARY

The present disclosure presents new and innovative systems and methods for collecting and analyzing sensor data from water fixtures to predict failures and water demand, ensure water delivery, and improve water conservation. In a first aspect, a method is provided that includes receiving sensor data regarding a water fixture, calculating changepoints within the sensor data, and splitting the sensor data into intervals at the changepoints. The method may further include classifying the intervals using a machine learning model and predicting a status of the water fixture based on the classified intervals.

In a second aspect according to the first aspect, the status includes one or more of a nominal state of the water fixture, a failure state of the water fixture, a disuse state of the water fixture, a seasonal disuse state of the water fixture, current water consumption using the water fixture, and predicted future water consumption using the water fixture.

In a third aspect according to any of the first and second aspects, the sensor data includes a condensed data stream from a sensor corresponding to the water fixture. The method may further include receiving a high-frequency data stream of sensor measurements from the sensor and generating the condensed data stream based on the high-frequency data stream.

In a fourth aspect according to any of the first through third aspects, calculating the changepoints includes calculating a first z-score for a first segment of the sensor data and a second z-score for a second segment of the sensor data, determining that a difference between the first and second z-scores exceeds a predetermined threshold, and identifying a changepoint between the first segment and the second segment. In certain implementations, the predetermined threshold is remotely updated at least in part based on the sensor data.

In a fifth aspect according to any of the first through fourth aspects, splitting the sensor data into intervals includes splitting the sensor data into intervals that include at least one overlapping data point with at least one adjacent intervals.

In a sixth aspect according to any of the first through fifth aspects, the status includes at least one of a flow rate through the water fixture and a water abstraction by the water fixture.

In a seventh aspect according to any of the first through sixth aspects, the status includes at least one water infrastructure measure for a region selected from the group consisting of previous rainfall in the region, predicted future rainfall in the region, groundwater availability in the region, surface water available in the region, and a likelihood of drought within the region.

In an eighth aspect according to any of the first through seventh aspects, the method further includes receiving weather data. The status of the water fixture may be predicted at least in part based on the weather data.

In a ninth aspect according to any of the first through eighth aspects, the method further includes receiving satellite image data. The status of the water fixture may be predicted at least in part based on the satellite image data.

In a tenth aspect according to any of the first through ninth aspects, the sensor data is associated with a plurality of water fixtures. Predicting the status may include predicting a plurality of statuses for at least a subset of the plurality of water fixtures.

In an eleventh aspect according to any of the first through tenth aspects, the machine learning model is trained to compensate for sensor drift and background noise within the sensor data over time.

In a twelfth aspect, a system is provided that includes a processor and a memory. The memory may store instructions which, when executed by the processor, cause the processor to receive sensor data regarding a water fixture, calculate changepoints within the sensor data, and split the sensor data into intervals at the changepoints. The memory may store further instructions which, when executed by the processor, cause the processor to classify the intervals using a machine learning model and predict a status of the water fixture based on the classified intervals.

In a thirteenth aspect according to the twelfth aspect, the status includes one or more of a nominal state of the water fixture, a failure state of the water fixture, a disuse state of the water fixture, a seasonal disuse state of the water fixture, current water consumption of the water fixture, and predicted future water consumption of the water fixture.

In a fourteenth aspect according to the any of the twelfth and thirteenth aspects, the sensor data includes a condensed data stream from a sensor corresponding to the water fixture. The memory may store further instructions which, when executed by the processor, cause the processor to receive a high-frequency data stream of sensor measurements from the sensor and generate the condensed data stream based on the high-frequency data stream.

In a fifteenth aspect according to any of the twelfth through fourteenth aspects, the memory stores further instructions which, when executed by the processor while calculating the changepoints, cause the processor to calculate a first z-score for a first segment of the sensor data and a second z-score for a second segment of the sensor data, determine that a difference between the first and second z-scores exceeds a predetermined threshold, and identify a changepoint between the first segment and the second segment.

In a sixteenth aspect according to any of the twelfth through fifteenth aspects, the status includes at least one of a flow rate through the water fixture and a water abstraction by the water fixture.

In a seventeenth aspect according to any of the twelfth through sixteenth aspects, the status includes at least one water infrastructure measure for a region selected from the group consisting of previous rainfall in the region, predicted future rainfall in the region, groundwater availability in the region, surface water available in the region, and a likelihood of drought within the region.

In an eighteenth aspect according to any of the twelfth through seventeenth aspects, the memory stores further instructions which, when executed by the processor, cause the processor to receive additional data including at least one of weather data and satellite image data. The status of the water fixture may be predicted at least in part based on the additional data.

In a nineteenth aspect according to any of the twelfth through eighteenth aspects, the sensor data is associated with a plurality of water fixtures. Predicting the status may include predicting a plurality of statuses for at least a subset of the plurality of water fixtures.

In a twentieth aspect, a non-transitory, computer-readable medium is provided storing instructions which, when executed by a processor, cause the processor to receive sensor data regarding a water fixture, calculate changepoints within the sensor data, and split the sensor data into intervals at the changepoints. The non-transitory, computer-readable medium may store further instructions which, when executed by a processor, cause the processor to classify the intervals using a machine learning model and predict a status of the water fixture based on the classified intervals.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Because of the remote nature of many of these water fixture installations, it is often difficult for technicians capable of monitoring and repairing the fixtures to regularly access the sites for maintenance purposes, or for water managers to accurately measure and predict water conservation, demand and use. Therefore, when the fixtures breakdown, it can be days, weeks, or even months before a technician visits a site to detect a breakdown and can be even longer before the technician is actually able to repair the water fixture.

One solution to this problem is to install sensors configured to monitor the operation and status of the water fixtures, including the condition of the fixtures themselves and water consumption through the fixtures. These sensors may be configured to remotely provide data regarding the water fixtures and water consumption to a monitoring platform, for example via cellular and/or satellite networks. However, such sensors may produce a vast amount of data, necessitating automated review to timely detect issues with the water fixtures. A machine learning platform trained on such sensor data may assist with building and refining one or more machine learning models capable of rapid analysis of sensor data to identify water fixture operating conditions. Based on this analysis, the models may also identify statuses of the water fixtures (e.g., water usage and/or flow rates through fixtures, overall water infrastructure health, and/or when a fixture has failed, is likely to fail soon, or otherwise needs service).

This analysis may involve several steps. First, statuses may be identified from raw sensor data. Second, the statuses may be verified by field technicians when they visit the deployment site. Third, predictive models may then be generated that will predict incidences of particular statuses (e.g., failures and/or water consumption) in the near future, allowing technicians to perform preventative maintenance to increase reliability and availability of the water fixtures and allowing for preemptive detection of potential water availability shortages or surpluses.

Figure 1:
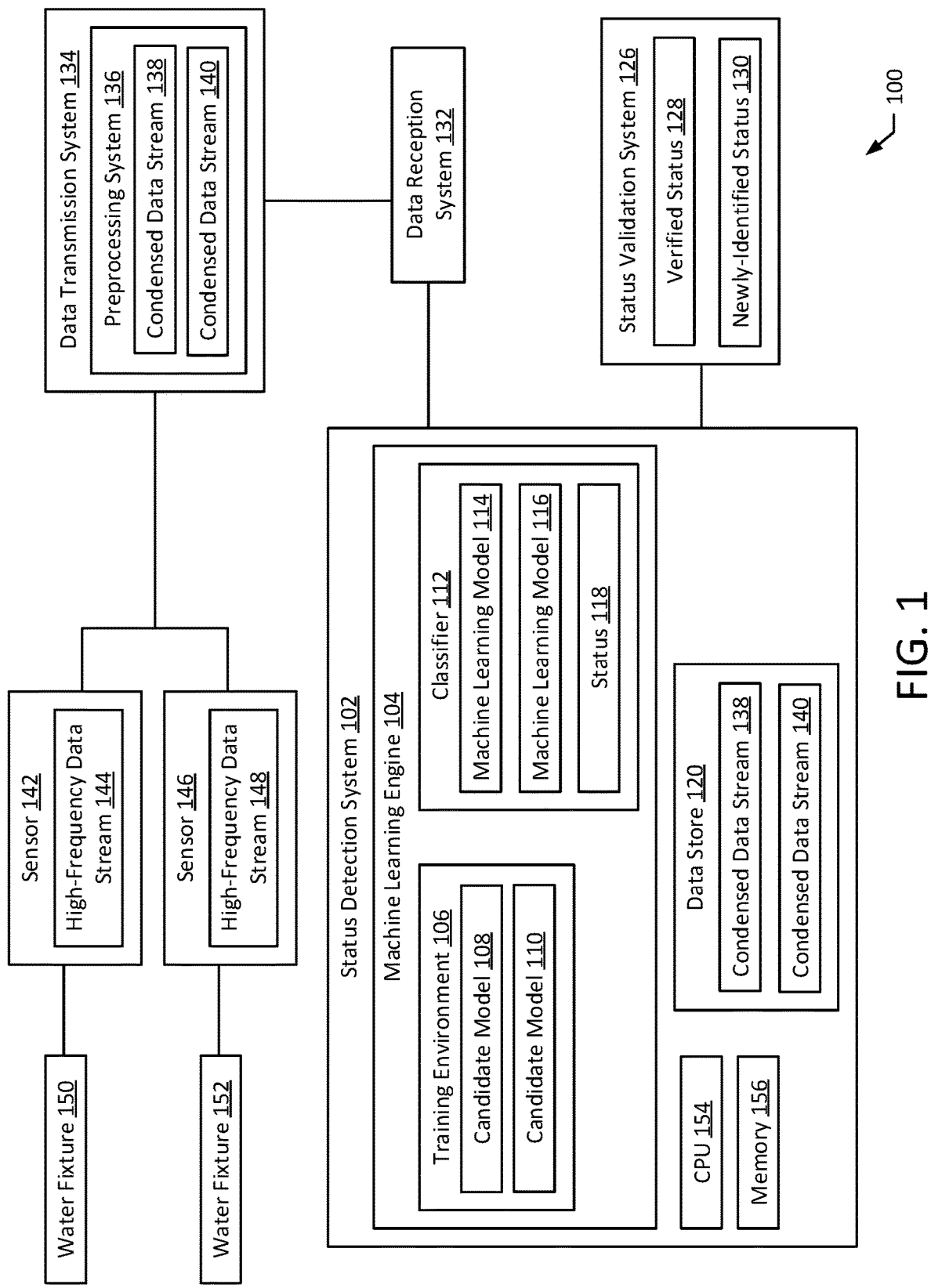
FIG. 1 illustrates a system according to an exemplary embodiment of the present disclosure.

FIG. 1 depicts a system 100 according to an exemplary embodiment of the present disclosure. The system 100 may be used to capture, collect, and classify sensor data from water fixtures to predict water fixture failure and water use statuses. The system 100 includes a status detection system 102, a validation system 126, a data transmission system 134, a data reception system 132, and sensors 142, 146 connected to respective water fixtures 150, 152.

The sensors 142, 146 may be configured to capture samples as high-frequency data streams 144, 148 from their respective water fixtures 150, 152. For example, the water fixtures 150, 152 may include one or more of a pump, faucet, borehole, pipe, water tank, and bacterial sensor. The sensors 142, 146 may be configured to capture operational data from these water fixtures 150, 152. For example, the sensors 142, 146 may include one or more of a current sensor, a flow rate sensor, a fill level sensor, and a motion sensor. The sensors 142, 146 may accordingly capture information regarding when the water fixtures 150, 152 are used, as well as information regarding how much water is used. In one example, if the water fixtures 150, 152 are water pumps responsible for extracting groundwater from a water table via a borehole, the sensors 142, 146 may comprise current sensors measuring an operating current of the pumps. The operating current may act as a proxy for both usage and flow rate through the pump. For instance, the pump may typically only activate when water is extracted from a faucet serviced by the pump, indicating approximate usage times. Similarly, the pump may use a greater current when moving more water, indicating approximate usage rates. The sensors 142, 146 may capture data at regular intervals (e.g., every second, every minute, every five minutes), forming the high-frequency data stream 144, 148.

The data transmission system 134 may be configured to receive the high-frequency data streams 144, 148 generated by the sensors 142, 146 and to transmit such data to the status detection system 102 via the data reception system 132. In certain implementations, the data transmission system 134 may transmit the data to the data reception system 132 via satellite data transmission. In particular, such deployments may be necessary or advantageous in areas with poor cellular data coverage. In other implementations, alternative transmission techniques may be used (e.g., cellular data, Ethernet, Wi-Fi connections). Because data may be more expensive to transfer via satellite data transmission (e.g., 2-3 times more expensive than cellular data transmissions), implementations relying on satellite data transmission may be configured to reduce the size of the high-frequency data streams 144, 148 prior to transmission. Accordingly, the data transmission system 134 includes a preprocessing system 136 configured to generate condensed data streams 138, 140 based on the high-frequency data streams 144, 148. For example, to reduce the size of the high-frequency data stream 144, 148, the preprocessing system 136 may average one or more data points from the high-frequency data stream 144, 148 into a single data point of the condensed data stream 138, 140. For example, the preprocessing system 136 may be configured to average data points captured during a certain time interval (e.g., every 10 minutes, every 30 minutes, every hour), to count the number of hours in a time period (e.g., a day) with water fixture 150, 152 usage, and/or to generate a binary indicator of whether the water fixture 150, 152 was used in a given time period (e.g., a day).

Figure 2:
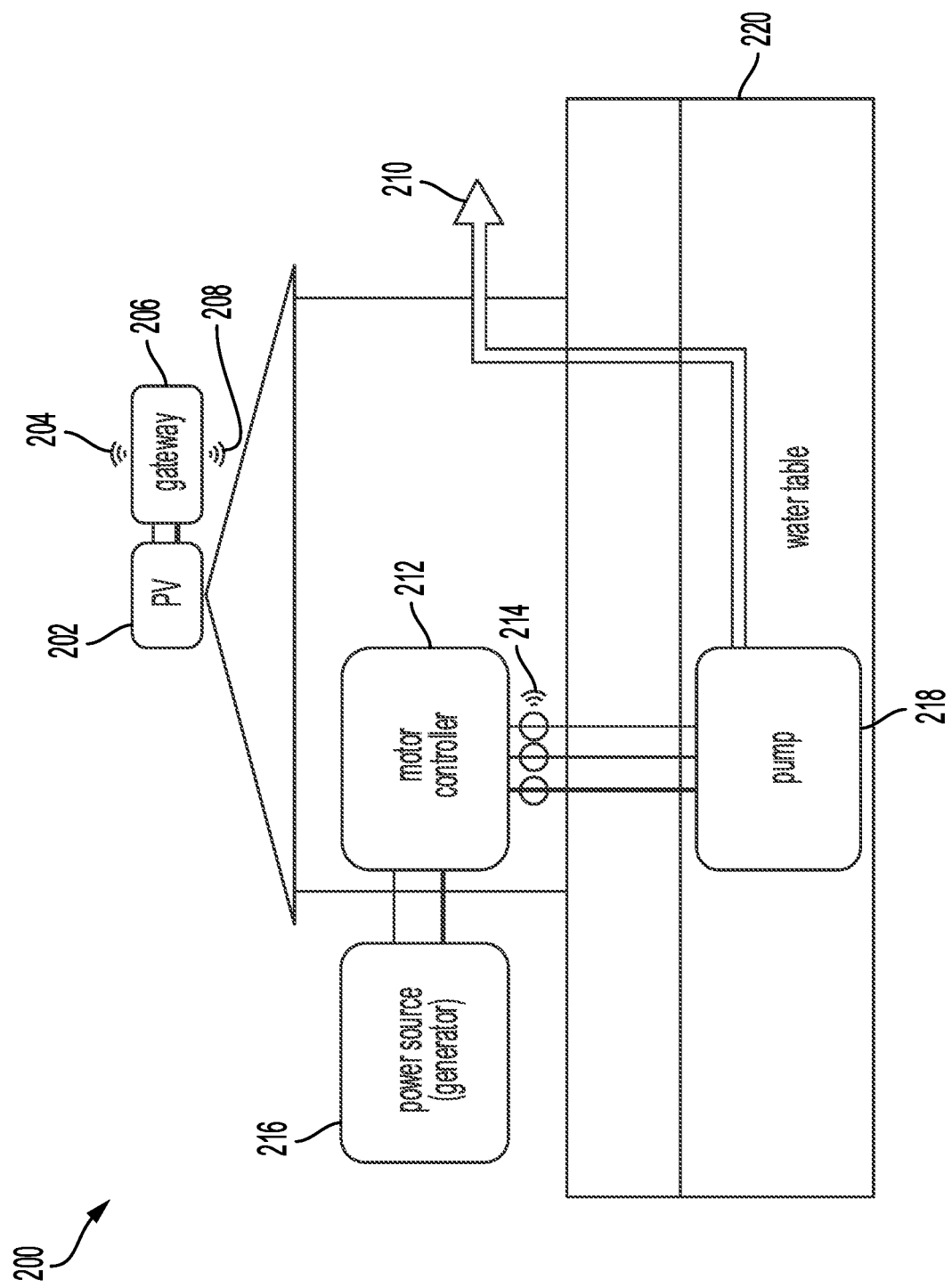
FIG. 2 illustrates a sensor deployment according to an exemplary embodiment of the present disclosure.

FIG. 2 depicts a sensor deployment 200 according to an exemplary embodiment of the present disclosure. For example, the sensor deployment 200 may depict an implementation of the water fixtures 150, 152, the sensors 142, 146, and the data transmission system 134. The sensor deployment 200 includes a pump 218 configured to pump water out of a water table 220 to an output 210. The pump 218 is controlled by a motor controller 212 and powered from a power source 216 (e.g., a generator) via the motor controller 212. The sensor deployment 200 includes one or more sensors 214 connected to the power leads between the motor controller 212 and the pump 218. In certain implementations, the sensors 214 may be provided as part of the pump 218. In the sensor deployment 200, the sensors 214 may be able to capture power data relating to an operating current or other power characteristic of the pump 218 while in operation. As explained above, such power information may serve as a proxy for usage times and usage rates. The sensor deployment 200 also includes a gateway 206 powered by photovoltaic array 202. The gateway 206 includes a receiver 208 configured to receive data from the sensors 214 via wireless transmission and a transmitter 204 configured to transmit data for further processing. The gateway 206 may implement one or more features of the data transmission system 134, including the preprocessing system 136. In other implementations, the sensors 214 may implement the preprocessing system 136, e.g., to save wireless bandwidth between the sensors 214 and the receiver 208.

Figure 3:
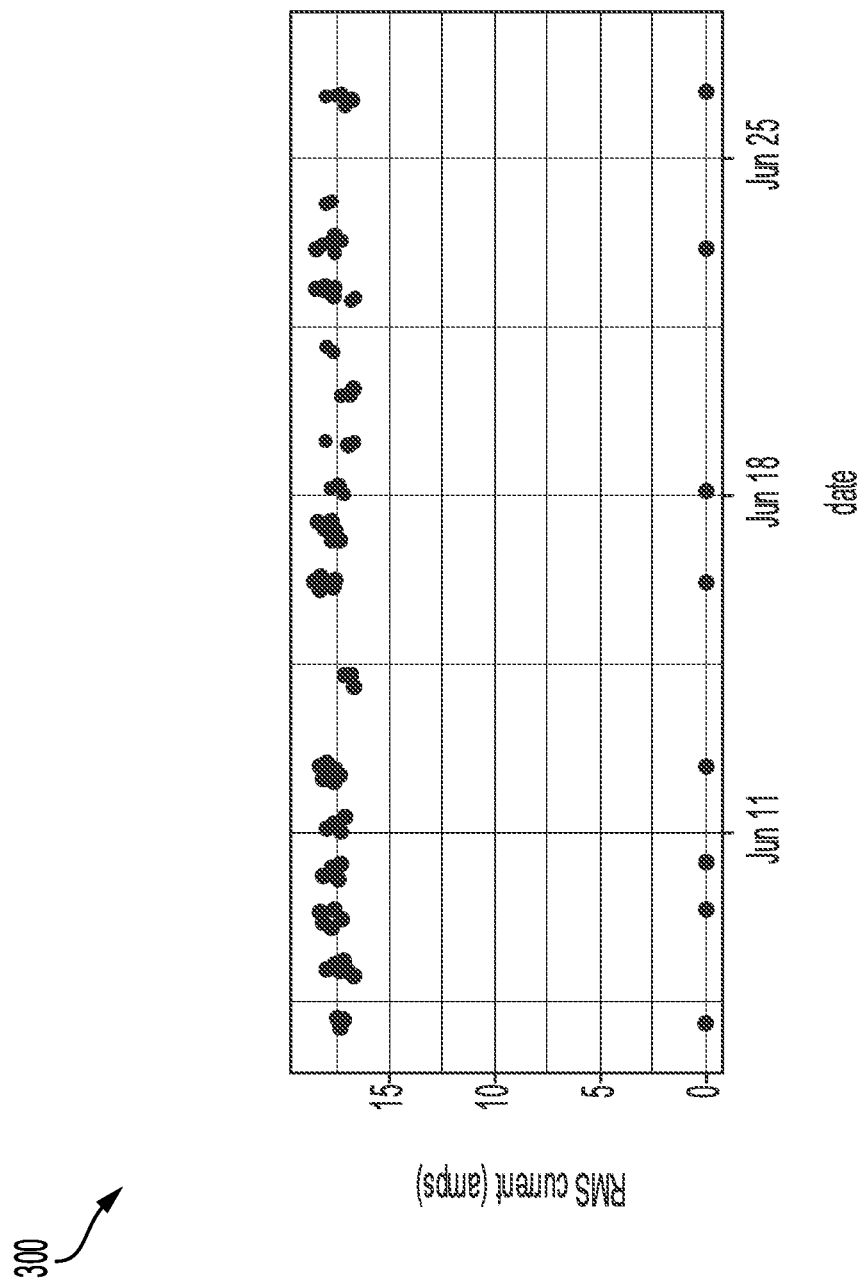
FIG. 3 illustrates raw sensor data according to an exemplary embodiment of the present disclosure.

FIG. 3 depicts raw sensor data 300 according to an exemplary embodiment of the present disclosure. The raw sensor data 300 may be collected by the sensors 214 in an implementation similar to the sensor deployment 200. In particular, the sensor data 300 may depict the current from the motor controller 212 to the pump 218 over time. As depicted, the current varies over time between 0 and 20 amps. At a given time, the presence of non-zero alternating current between the motor controller 212 and the pump 218 may be used as a proxy measurement of the times of day when the pump 218 is used. Based on such an interpretation, the raw sensor data 300 depicts a cyclical nature of pump usage, with the pump 218 being used predominantly during daylight hours and very little or not at all during nighttime hours.

Returning to FIG. 1, the status detection system 102 may receive data from the data transmission system 134 via the data reception system 132. In implementations where the data transmission system 134 is implemented using satellite data transmissions, the data reception system 132 may receive the satellite data transmissions and may relay them to the status detection system 102 via terrestrial data transmission means (e.g., Ethernet, cellular data, wireless networking/Wi-Fi). The status detection system 102 may then store the received condensed data streams 138, 140 in the data store 120.

The status detection system 102 may be configured to analyze condensed data streams 138, 140 stored in the data store 120 to predict statuses 118 of the water fixtures 150, 152. For example, the machine learning engine 104 may be configured to analyze the condensed data streams 138, 140 with a classifier 112 to identify statuses 118. As explained further below, the statuses 118 may include statuses regarding the water fixtures 150, 152 themselves (e.g., operating status and/or failure of the water fixtures 150, 152), water usage by the water fixtures 150, 152, and/or water availability conditions for a region corresponding to water fixtures 150, 152 (e.g., water table availability, water usage in the region, and/or predicted water demand). The classifier 112 may utilize one or more machine learning models 114, 116 in performing the analysis. Additionally, to increase detection accuracy, the machine learning engine 104 may also include a training environment 106 configured to train the classifier 112. The training environment 106 includes a plurality of candidate models 108, 110 that may be tested and refined using training data to enhance the machine learning models 114, 116. In particular, the classifier 112 may comprise a collection of machine learning models 114, 116 that were each developed and refined as candidate models 108, 110 prior to being deployed within the classifier 112.

The system 100 further includes a validation system 126, which may be configured to verify statuses 118 from the status detection system 102. For example, the validation system 126 may be configured to receive user input from technicians in the field, who visit and inspect water fixtures 150, 152 that have been predicted to fail according to a status 118 predicted by the classifier 112. If the technician is able to verify a status 118, the technician may generate a verified status 128. The verified failure 128 may indicate that the predicted failure did occur and may include a type of failure. In addition, if the technician notices a failure with a water fixture 150, 152 (e.g., during routine maintenance and monitoring) that has no corresponding predicted failure from the classifier 112, the technician may create a newly-identified status 130 via the validation system 126. The validation system 126 may also be configured to verify other types of statuses 118. For example, the validation system 126 may receive user input regarding water usage, water table availability, and/or projected water demand to verity statuses 118 regarding water demand and/or availability. If the user input indicates that the status is correct, the validation system 126 may generate a verified status 128. In certain implementations, the validation system 126 may be implemented at least in part by a software application running on a mobile device (e.g., a computerized form accessible via a smart phone or other portable computing device).

The status detection system 102 also includes a CPU 154 and a memory 156. The CPU 154 and the memory 156 may implement one or more aspects of the status detection system 102, such as the machine learning engine 104 and the data store 120. For example, the memory 156 may store instructions which, when executed by the CPU 154 may perform one or more of the operational features of the status detection system 102. In addition, although not depicted, the sensors 142, 146, the data transmission system 134, the data reception system and/or the validation system 126 may also include a CPU and memory responsible for implementing one or more features.

Figure 4:
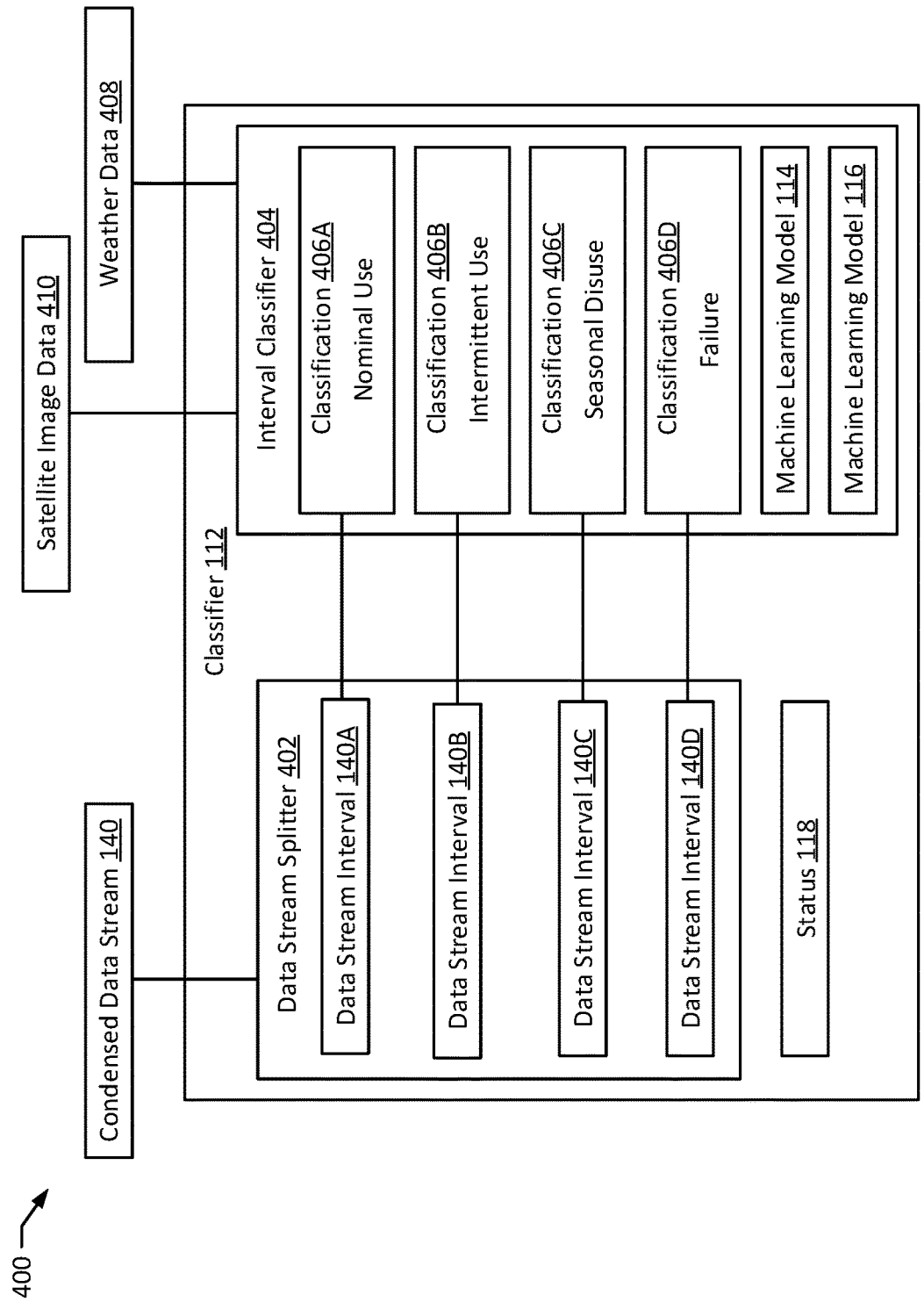
FIG. 4 illustrates a classifying system according to an exemplary embodiment of the present disclosure.

FIG. 4 depicts a classifying system 400 according to an exemplary embodiment of the present disclosure. As depicted, the classifying system 400 may be an example implementation of the classifier 112. The classifier 112 includes a data stream splitter 402 and an interval classifier 404. The data stream splitter 402 receives a condensed data stream 140 and the interval classifier 404 receives weather data 408 and satellite image data 410. Using the data stream splitter 402 and the interval classifier 404, the classifier 112 may identify statuses 118 for one or more water fixtures.

The data stream splitter 402 may be configured to split the condensed data stream 140 into a plurality of data stream intervals 140A-D. As explained further below, the data stream splitter 402 may split the condensed data stream 140 using changepoint detection techniques. The interval classifier 404 may then analyze each of the data stream intervals 140A-D to assign a classification 406A-D for each data stream intervals 140A-D. For example, the machine learning models 114, 116 may analyze sensor data from the data stream intervals 140A-D and may each generate an estimated classification for the data stream intervals 140A-D. The interval classifier 404 may then combine the estimated classifications (e.g., using one or more weights associated with each machine learning model 114, 116) to generate a classification 406A-D for the data stream intervals 140A-D. The interval classifier 404 may be configured to assign one of four classifications to each data stream interval 140A-D: nominal use indicating that the water fixture 150, 152 is operating normally and is being used at regular intervals; intermittent use indicating that the water fixture 150, 152 is being used less consistently than normal; seasonal disuse indicating that the water fixture 150, 152 is used less consistently than normal due to seasonal changes; and failure indicating that the water fixture 150, 152 is predicted to have failed. Additionally, although not depicted, the classifications 406A-D may additionally or alternatively include classifications regarding water availability, consumption, and/or demand. For example, the classifications may indicate a predicted volume or range of volumes of water demand anticipated in a future time period (e.g., the next day, week, month, year), an estimated volume or range of volumes of water used in a previous time period (e.g., the previous day, week, month, year), and/or an estimated amount of water available in a water table. In certain implementations, rather than classifying based on specific volumes, the classifications 406A-D may indicate a relative amount of water availability, consumption, and/or demand, such as a high/low availability, a high/low consumption, and/or a high/low demand.

In certain implementations, the interval classifier 404 may also identify sensor failures for one or more of the data stream intervals 140A-D, indicating that the sensor 142, 146, 214 collecting the associated data had an error and that the data stream interval 140A-D should be excluded from further analysis. As depicted, the interval classifier 404 has classified (i) data stream interval 140A with a classification 406A of nominal use, (ii) data stream interval 140B with a classification 406B of intermittent use, (iii) data stream interval 140C with a classification 406C of seasonal disuse, and (iv) data stream interval 140D with a classification 406D of failure. These classifications 406A-D are merely exemplary, and other permutations are possible depending on the operating conditions of the water fixture 150, 152 and the sensor data within the condensed data stream 140. For example, if there is no error with the water fixtures 150, 152, the classifications 406A-D may all indicate nominal use.

The machine learning models 114, 116 may be trained in the training environment 106 of the machine learning engine 104. For example, when training the machine learning models 114, 116 to detect failures, because water fixture 150, 152 failures are relatively rare as a percentage of total fixture uptime, training the machine learning models 114, 116 may rely on statistical process control to determine when the system has deviated from some known period of nominal functionality (e.g., the nominal use depicted in classification 406A). Such an implementation may also be appropriate in situations where water fixture 150, 152 failure has significant operational and monetary costs, occurs rarely, and where there are no prior sensor-measured occurrences. As another example, the machine learning models 114, 116 may be trained to account for long-term trends within data from the sensors 142, 146 that can negatively impact the accuracy of short-term sensor measurement and comparison. For example, the machine learning models 114, 116 may be trained to account for signal noise and drift within the sensors 142, 146 and/or background noise within the sensors 142, 146. As a specific example, over long periods of time (e.g., weeks, months, or years), certain sensors 142, 146 (e.g., current and/or flow rate sensors) may drift (e.g., change in baseline values) slightly (e.g., by 1-10%). In situations such as those discussed above where failure of water fixtures occurs rarely, the signal drift between failures can be significant. Such large signal drifts can reduce the effectiveness of detecting changes in the operating conditions, which may cause pumps that have failed to be classified as operating nominally (or vice-versa). Therefore, the machine learning models 114, 116 may be trained to take such signal drift into account. In particular, one or more of the machine learning models 114, 116 may analyze the condensed data stream 140 prior to processing by the data stream splitter 402 to adjust the condensed data stream 140, correct for signal drift, and improve the accuracy of the changepoint techniques utilized by the data stream splitter 402.

In identifying the nominal behavior, the machine learning models 114, 116 may utilize multiple features. For example, where the water fixtures 150, 152 are pumps, the features may include one or more of RMS current on all three phases powering the pump, the standard deviation of RMS current between all three phases, peak daily power, total daily energy, on and off cycles per day, and RMS inrush current (e.g., the high current produced when a motor is first turned on). These features may be analyzed on a regular basis (e.g., an hourly basis, a daily basis) and may include z-score corrected rollups of hourly and day-of-week values for one or more of the features.

Once trained, the machine learning models 114, 116 may analyze the defined features on a continual basis and may generate a regular statistic (e.g., a day-wise statistic) that estimates how "nominal" the pump's behavior compared to a certain training set of data is indicative "nominal" behavior. For example, the regular statistic may be generated by classifying the data stream intervals 140A-D from the condensed data stream 140 (e.g., the condensed data stream 140 from the preceding day). In certain implementations, the training environment 106 may be implemented at least in part by the SuperLearner platform and may use cross-validation to select the machine learning models 114, 116 as an optimal combination of the candidate models 108, 110. The candidate models 108, 110 may include models of different types. Although only two machine learning models 114, 116 are depicted, in one implementation, the machine learning models 114, 116, may be implemented from models including a random forest model, a lasso model, an extreme gradient boosting (xgboost) model, and a mean proportion model. A weighted combination of these models may be selected to maximize the cross-validated multinomial log likelihood of correctly identifying failure in a training dataset.

For example, training data may be labeled based on previously-collected sensor data. Labels may be manually applied using a combination of field-verified pump statuses (e.g., via the validation system 126) and historical knowledge of patterns of fixture performance (e.g., that short periods of pump disuse shortly after large rain events typically constitute seasonal pump disuse).

One or more of the machine learning models 114, 116 may also incorporate other external data, such as weather data 408 and satellite image data 410. For example, if the weather data 408 indicates very little rain during a specific time period, the machine learning model 114, 116 may adjust to account for increased water usage. Conversely, if the weather data 408 indicates heavy rain during a specific time period, the machine learning model 114, 116 may adjust to account for decreased water usage. Similarly, satellite image data 410 may be used to estimate, e.g., water table conditions for a region (e.g., a region containing multiple water fixtures 150, 152). For example, if the satellite image data 410 indicates an increase in plant growth in a region (e.g., an increase in portions of the satellite image data 410 containing green pixels), the machine learning model 114, 116 may determine that there is more water available in a water table (e.g., more groundwater available and/or more surface water available) for the region than if the satellite image data 410 indicates a decrease in plant growth in the region.

Based on the classifications 406A-D, the classifier 112 may then identify statuses 118. For example, the statuses 118 may include a health measure of the water fixtures 150, 152 for which condensed data streams 140 are received (e.g., nominal status indicating proper functioning, failure indicating the water fixture has failed). In particular, if one or more data stream intervals 140A-D are classified as a failure, the classifier 112 may identify a status 118 corresponding the sensor 142, 146, 214 that generated the sensor data within the condensed data stream 140 (e.g., for a water fixture associated with the sensor 142, 146, 214). As another example, the statuses 118 may include usage information for the water fixtures 150, 152 (e.g., flow rates and/or water abstraction volumes through the water fixtures 150, 152). As a further example, the statuses 118 may include statuses for a particular region (e.g., available water, likelihood of drought conditions, forecast water demand).

Figure 5:
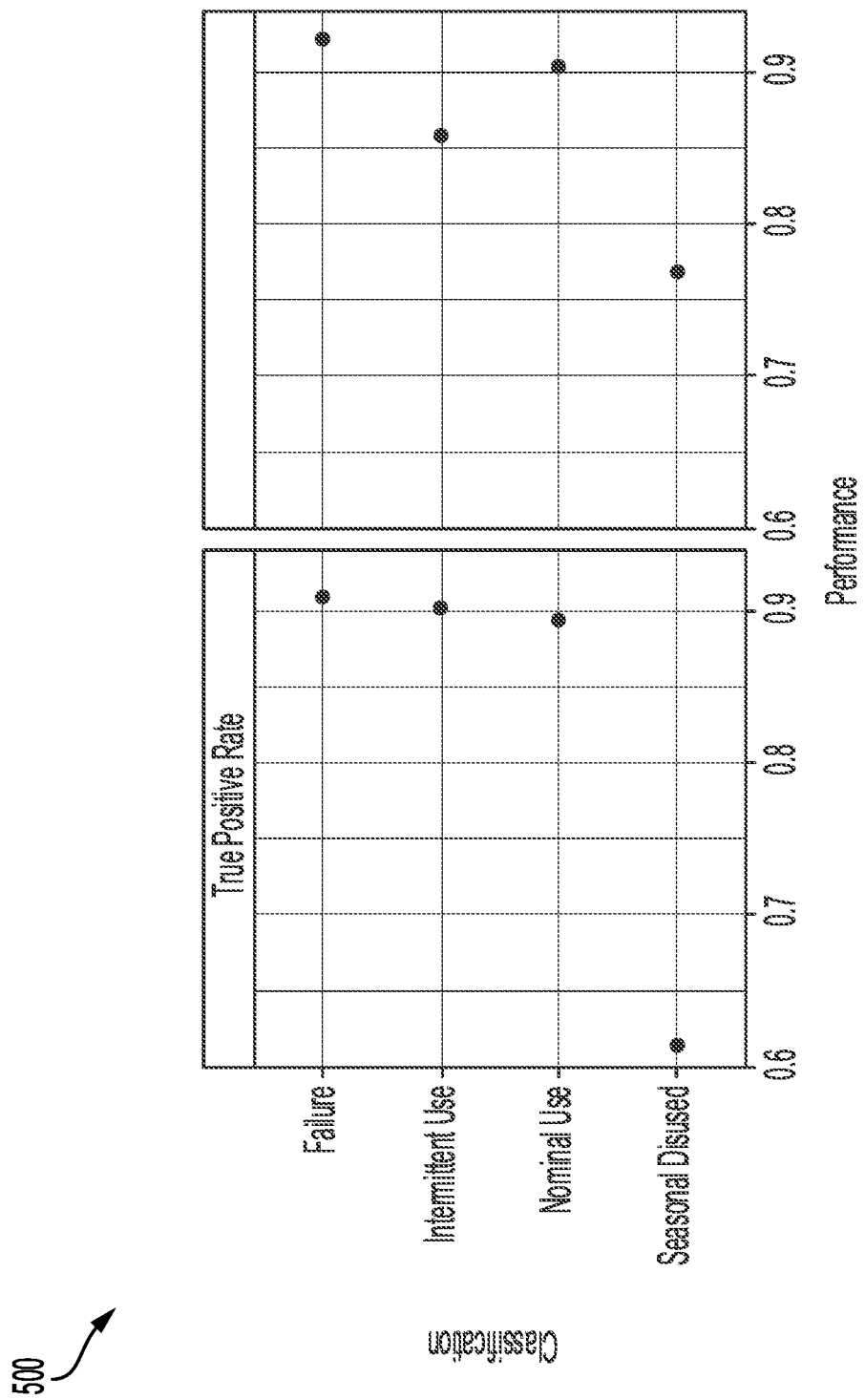
FIG. 5 illustrates experimental classifier output according to an exemplary embodiment of the present disclosure.
Figure 6:
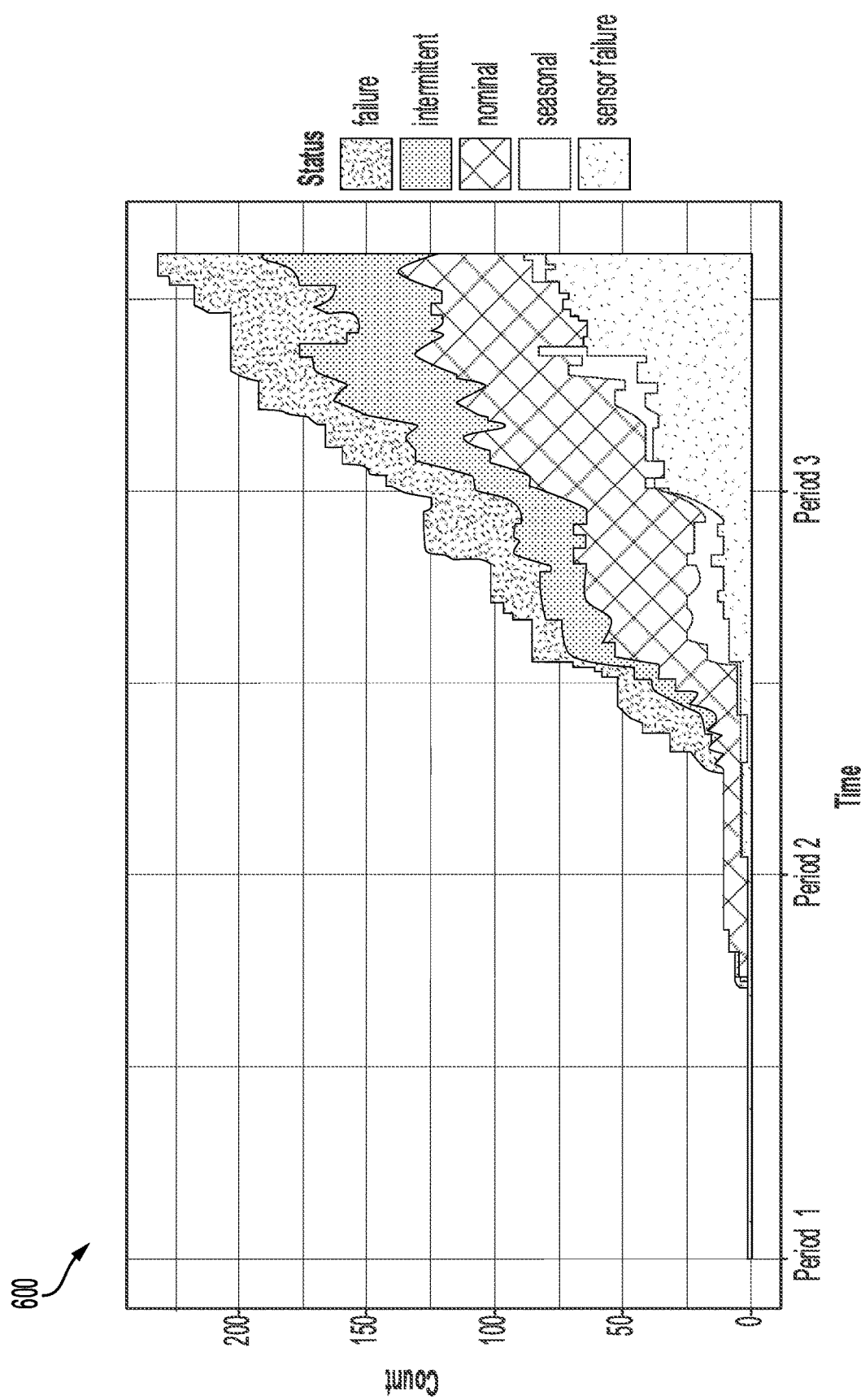
FIG. 6 illustrates experimental classifier output according to an exemplary embodiment of the present disclosure.

FIGS. 5 and 6 depict experimental classifier outputs 500, 600 according to an exemplary embodiment of the present disclosure. In the depicted examples, to generate the experimental outputs, machine learning models 114, 116 were trained to classify data stream intervals 140A-D from borehole pump sensor data. The models 114, 116 were trained to use multiple features, including proportion of days with pump usage, mean pump usage proportion per day, max pump usage proportion per day, median pump usage proportion per day, standard deviation of pump usage proportion per day, average rainfall over the interval, average rainfall over the interval lagged by 7 days, average rainfall over the interval lagged by 30 days, average rainfall over the interval lagged by 60 days, length of the interval, and month of the year.

The machine learning models 114, 116 were trained on a training set of pump data that resulted in an overall model weighting of a 32% weight for the random forest model, a 10% weight for the lasso model, a 58% for the xgboost model, and a 0% weight for the mean proportion model. The weighted machine learning models 114, 116 then generated classifications 406A-D for data stream intervals 140A-D from a labeled training set. As can be seen in FIG. 5, the overall accuracy of the weighted models was 89%. True positive rates for the failure, intermittent use, and nominal use were all close to 90%, but seasonal disuse was more difficult to classify, with a true positive rate of just over 60%. The weighted machine learning models 114, 116 were also used to predict pump status over time, as shown in FIG. 6, with the number of pumps in each category indicated by the corresponding color and with the total number of observed pumps on each date indicated by the total height of the plot at each date.

Figure 7:
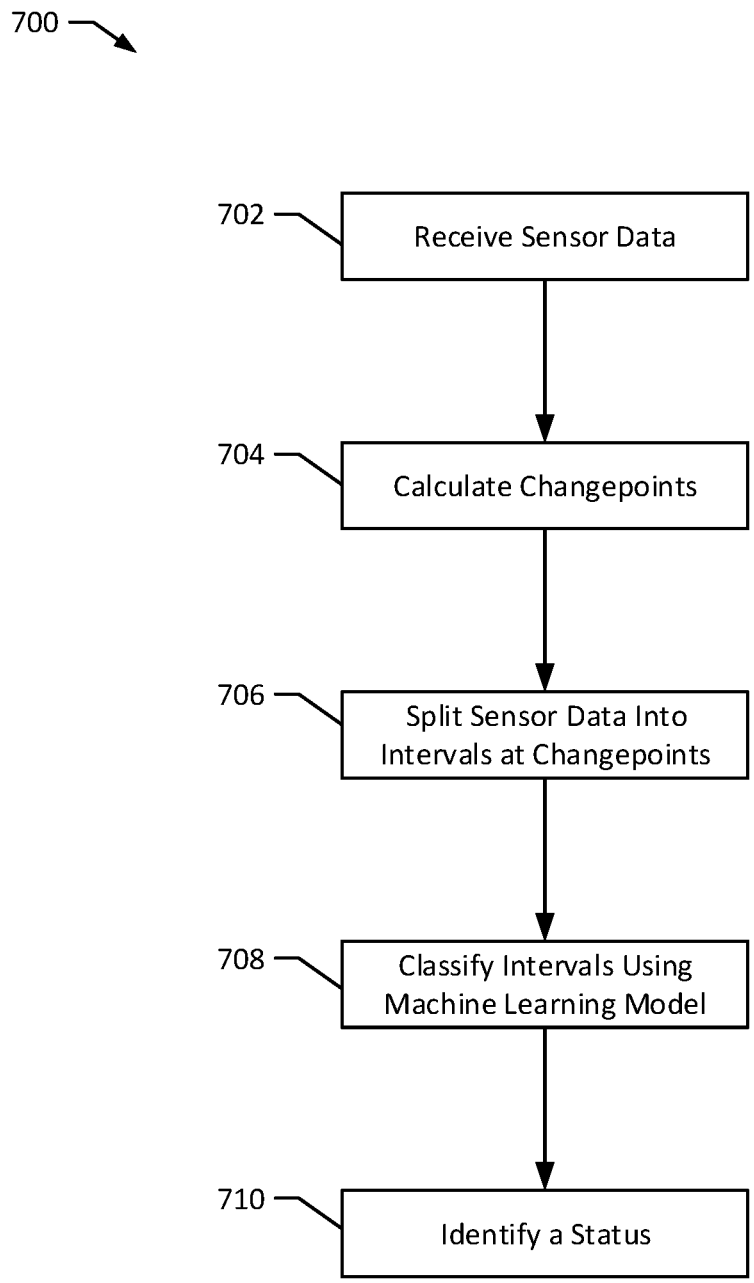
FIG. 7 illustrates a method according to an exemplary embodiment of the present disclosure.

FIG. 7 depicts a method 700 according to an exemplary embodiment of the present disclosure. The method 700 may be performed to analyze sensor data from water fixtures 150, 152 to identify statuses 118 in the water fixtures 150, 152. The method 700 may be implemented on a computer system, such as the system 100. For example, the method 700 may be performed by the status detection system 102, such as by the classifier 112. The method 700 may also be implemented by a set of instructions stored on a computer readable medium that, when executed by a processor, cause the processor to perform the method. For example, all or part of the method 700 may be implemented by the CPU 154 and the memory 156. Although the examples below are described with reference to the flowchart illustrated in FIG. 7, many other methods of performing the acts associated with FIG. 7 may be used. For example, the order of some of the blocks may be changed, certain blocks may be combined with other blocks, one or more of the blocks may be repeated, and some of the blocks described may be optional.

The method 700 begins with the classifier 112 receiving sensor data (block 702). For example, the classifier 112 may receive a condensed data stream 138, 140 generated from the high-frequency data stream 144, 148 of a sensor 142, 146. In particular, the sensor data may represent operational characteristics of a water fixture 150, 152 over time.

The data stream splitter 402 of the classifier 112 may then calculate changepoints within the received sensor data (block 704). For example, the data stream splitter 402 may use a changepoint detection technique that uses two sample z-tests to compare adjacent periods of time to test for a prospective changepoint. In particular, such a test may be used to compare both data stream intervals 140A-D indicating a proportion of hours of fixture use each day, and data stream intervals 140A-D involving a binary indicator of any fixture use on each day. For example, a prospective changepoint may be detected if a difference between two z-tests for adjacent periods of time exceeds a predetermined threshold. As a specific example, if the difference between two z-scores exceeds 3, a changepoint may be identified, indicating a change in usage patterns. Changepoints may also be created before and after any sensor outage of three or more days. In certain implementations, the predetermined threshold may be updated automatically (e.g., based on verified changepoints) and/or may be updated remotely via communication with the data transmission system 134 (e.g., via the status detection system 102). In particular, in certain instances, the predetermined threshold may be updated based on a region-wide analysis of sensor data from multiple water fixtures located in the same region (e.g., accessing the same water table).

The data stream splitter 402 may then split the sensor data into intervals at the changepoints (block 706). For example, the data stream splitter 402 may split the condensed data stream 140 into a plurality of data stream intervals 140A-D at the identified changepoints. For instance, the data stream splitter 402 may split the condensed data stream 140 into the data stream intervals 140A-D without overlapping data points between the data stream intervals 140A-D (e.g., so that no data stream interval 140A-D includes common data points with adjacent data stream interval(s) 140A-D). In other implementations, the data stream intervals 140A-D may be split with overlapping data points between the intervals (e.g., so that at least one of the data stream intervals 140A-D has common data point(s) with one or more adjacent data stream intervals 140A-D).

The interval classifier 404 may then classify the data stream intervals 140A-D using at least one machine learning model 114, 116 (block 708). As explained above, the machine learning model 114, 116 may analyze each data stream interval 140A-D and may generate a classification 406A-D for each data stream interval 140A-D. In particular, the machine learning model 114, 116 may be trained to analyze the data stream intervals 140A-D, as explained above. The interval classifier 404 may analyze and classify each data stream interval 140A-D independently, or may analyze and classify more than one data stream interval 140A-D in parallel. As further explained above, the interval classifier 404 and/or the machine learning model 114, 116 may also incorporate additional data into the analysis of the data stream intervals 140A-D (e.g., by adjusting the analysis and/or the data points within the data stream intervals 140A-D to account for weather conditions). For example, the interval classifier 404 may incorporate one or more of weather data 408 and satellite image data 410, as described above. In still further implementations, the interval classifier 404 may incorporate data stream intervals 140A-D corresponding to multiple water fixtures 150, 152. For example, the interval classifier may be configured to analyze and classify data stream intervals 140A-D from water fixtures that are located near one another. For example, if there are five water fixtures 150, 152 located near one another (e.g., within a predetermined threshold distance of one another, within a predetermined threshold distance of a town or other population center), and three of the water fixtures 150, 152 have higher usage than the remaining two water fixtures 150, 152, the interval classifier 404 may classify the data streams 140A-D from the three water fixtures 150, 152 as having "nominal" use and may classify the data streams 140A-D from the two water fixtures 150, 152 as having "intermittent" use. In still further implementations, the interval classifier 404 (e.g., one or more of the machine learning models 114, 116) may be configured to analyze condensed data streams 140 for spatial and temporal trends to identify particular indicators of conditions on a regional scale (e.g., across multiple water fixtures, across water fixtures within a particular water table, across water tables within a particular country or other region) and on a site-specific level (e.g., statuses 118 of particular water fixtures 150, 152).

The classifier 112 may then identify a status 118 the water fixture (block 710). For example, the classifier 112 may identify a status 118 of the water fixtures 150, 152 corresponding to the data stream interval 140A-D. As a further example, where the classifier 112 receives and analyzes condensed data streams 140 for more than one water fixture 150, 152, the classifier 112 may identify a status 118 of the water fixtures 150, 152 for which condensed data streams 140 were received. In certain instances, the classifier 112 may determine, based on the data stream intervals, that a water fixture 150, 152 has a "healthy" or "nominal" status, indicating that no further action is necessary.

In other instances, the status 118 may additionally or alternatively include information about overall usage of the water fixtures 150, 152. For example, the classifier 112 may predict water flow rates through the water fixtures 150, 152 (e.g., water flow rates per day, week, month; water flow rates at peak times during a day, week, month) and/or may predict water abstraction volumes (e.g., total volume of water abstracted during the preceding hour, day, week, month). Based on such statuses 118, the classifier 112 may further predict the water availability in a particular area. For example, the classifier 112 may correlate water abstraction volumes with weather data 408 to determine whether more water is removed from a particular region and/or water table than is being replaced by rainfall in the surrounding area. In situations where water abstraction is greater than water replacement, the classifier 112 may determine that overall water availability has fallen. As another example, the classifier 112 may predict water demand in a given region (e.g., based on a predicted weather forecast for the region and/or based on previous, seasonal water usage in the region). In instances where water demand is forecast to exceed water availability, the classifier 112 may determine that the region is at risk for a drought in the future.

In still further implementations, analysis of multiple water fixtures may be used to predict the status of individual water fixtures. For example, if multiple water fixtures in an area show nominal water usage, but another water fixture in the area shows intermittent use, the intermittent usage may suggest that the other water fixtures has failed or is having other issues (e.g., reduced access to ground water). In this way, analyzing multiple water fixtures may further improve the accuracy of statuses predicted for individual water fixtures.

In still further instances, the classifier 112 may identify a potential failure of a water fixture 150, 152. For example, based on the classifications 406A-D, the classifier 112 may identify a potential failure if more than one of the data stream intervals 140A-D receives a classification 406A-D indicating failure. The classifier 112 may then generate the potential failure to identify the water fixture 150, 152 associated with the condensed data stream 140 from which the data stream interval 140A-D originated. If a potential failure is identified, a technician may be sent to the water fixture 150, 152 to verify the error. The technician may inspect the water fixture 150, 152 and may determine whether there is actually an error with the water fixture 150, 152. If there is an error, the technician may enter a verified failure 128 via the validation system 126. If there is no error, the technician may also indicate no failure via the validation system 126. The verified failure 128 or lack of failure with the water fixture 150, 152 may be used for training purposes. For example, verified failures 128 and the associated condensed data streams 140 and/or data stream intervals 140A-D may be provided to the training environment 106 for further training of candidate model 108, 110 or the machine learning models 114, 116 themselves.

All of the disclosed methods and procedures described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method comprising: receiving sensor data regarding a water fixture; calculating changepoints within the sensor data, wherein calculating the changepoints includes: calculating a first standardized variable for a first segment of the sensor data and a second standardized variable for a second segment of the sensor data; determining that a difference between the first standardized variable and the second standardized variable exceeds a predetermined threshold; and identifying a changepoint between the first segment and the second segment; splitting the sensor data into a plurality of time intervals at the changepoints, wherein each time interval of the plurality of time intervals includes at least one overlapping data point with at least one adjacent time interval of the plurality of time intervals; classifying the time intervals using a machine learning model; and predicting a status of the water fixture based on the classified time intervals.

2. The method of claim 1, wherein the status includes one or more of a nominal state of the water fixture, a failure state of the water fixture, a disuse state of the water fixture, a seasonal disuse state of the water fixture, current water consumption of the water fixture, and predicted water consumption of the water fixture.

3. The method of claim 1, wherein the sensor data includes a condensed data stream from a sensor corresponding to the water fixture, and wherein the method further comprises:
   receiving a high-frequency data stream of sensor measurements from the sensor; and
   generating the condensed data stream based on the high-frequency data stream.

4. The method of claim 1, wherein the predetermined threshold is remotely updated at least in part based on the sensor data.

5. The method of claim 1, wherein the status includes a water abstraction by the water fixture.

6. The method of claim 1, wherein the status includes at least one water infrastructure measure for a region selected from the group consisting of groundwater availability in the region, and surface water available in the region.

7. The method of claim 1, further comprising receiving weather data, and wherein the status of the water fixture is predicted at least in part based on the weather data.

8. The method of claim 1, further comprising receiving satellite image data, and wherein the status of the water fixture is predicted at least in part based on the satellite image data.

9. The method of claim 1, wherein the sensor data is associated with a plurality of water fixtures, and wherein predicting the status includes predicting a plurality of statuses for at least a subset of the plurality of water fixtures.

10. The method of claim 1, wherein the machine learning model is trained to compensate for at least one of sensor drift and background noise within the sensor data over time.

11. The method of claim 1, wherein the status includes a flowrate through the water fixture and at least one of previous rainfall in a region, predicted future rainfall in the region, and a likelihood of drought within the region.

12. A system comprising: a processor; and a memory storing instructions which, when executed by the processor, cause the processor to: receive sensor data regarding a water fixture; calculate changepoints within the sensor data, wherein calculating the changepoints includes: calculating a first standardized variable for a first segment of the sensor data and a second standardized variable for a second segment of the sensor data; determining that a difference between the first standardized variable and the second standardized variable exceeds a predetermined threshold; and identifying a changepoint between the first segment and the second segment; split the sensor data into a plurality of time intervals at the changepoints, wherein each time interval of the plurality of time intervals includes at least one overlapping data point with at least one adjacent time interval of the plurality of time intervals; classify the time intervals using a machine learning model; and predict a status of the water fixture based on the classified time intervals.

13. The system of claim 12, wherein the status includes one or more of a nominal state of the water fixture, a failure state of the water fixture, a disuse state of the water fixture, a seasonal disuse state of the water fixture, current water consumption of the water fixture, and predicted water consumption of the water fixture.

14. The system of claim 12, wherein the sensor data includes a condensed data stream from a sensor corresponding to the water fixture, and wherein the memory stores further instructions which, when executed by the processor, cause the processor to:
   receive a high-frequency data stream of sensor measurements from the sensor; and
   generate the condensed data stream based on the high-frequency data stream.

15. The system of claim 12, wherein the status includes at least one water infrastructure measure for a region selected from the group consisting of previous rainfall in the region, predicted future rainfall in the region, groundwater availability in the region, surface water available in the region, and a likelihood of drought within the region.

16. The system of claim 12, wherein the memory stores further instructions which, when executed by the processor, cause the processor to receive additional data including at least one of weather data and satellite image data, and wherein the status of the water fixture is predicted at least in part based on the additional data.

17. The system of claim 12, wherein the sensor data is associated with a plurality of water fixtures, and wherein predicting the status includes predicting a plurality of statuses for at least a subset of the plurality of water fixtures.

18. A non-transitory, computer-readable medium storing instructions which, when executed by a processor, cause the processor to: receive sensor data regarding a water fixture; calculate changepoints within the sensor data, wherein calculating the changepoints includes: calculating a first standardized variable for a first segment of the sensor data and a second standardized variable for a second segment of the sensor data; determining that a difference between the first standardized variable and the second standardized variable exceeds a predetermined threshold; and identifying a changepoint between the first segment and the second segment; split the sensor data into a plurality of time intervals at the changepoints, wherein each time interval of the plurality of time intervals includes at least one overlapping data point with at least one adjacent time interval of the plurality of time intervals; classify the time intervals using a machine learning model; and predict a status of the water fixture based on the classified time intervals.

* * * * *